July 17, 1956     B. CHANCE     2,755,462
ICONOSCOPE RADAR-RANGING SYSTEM
Filed Feb. 14, 1946
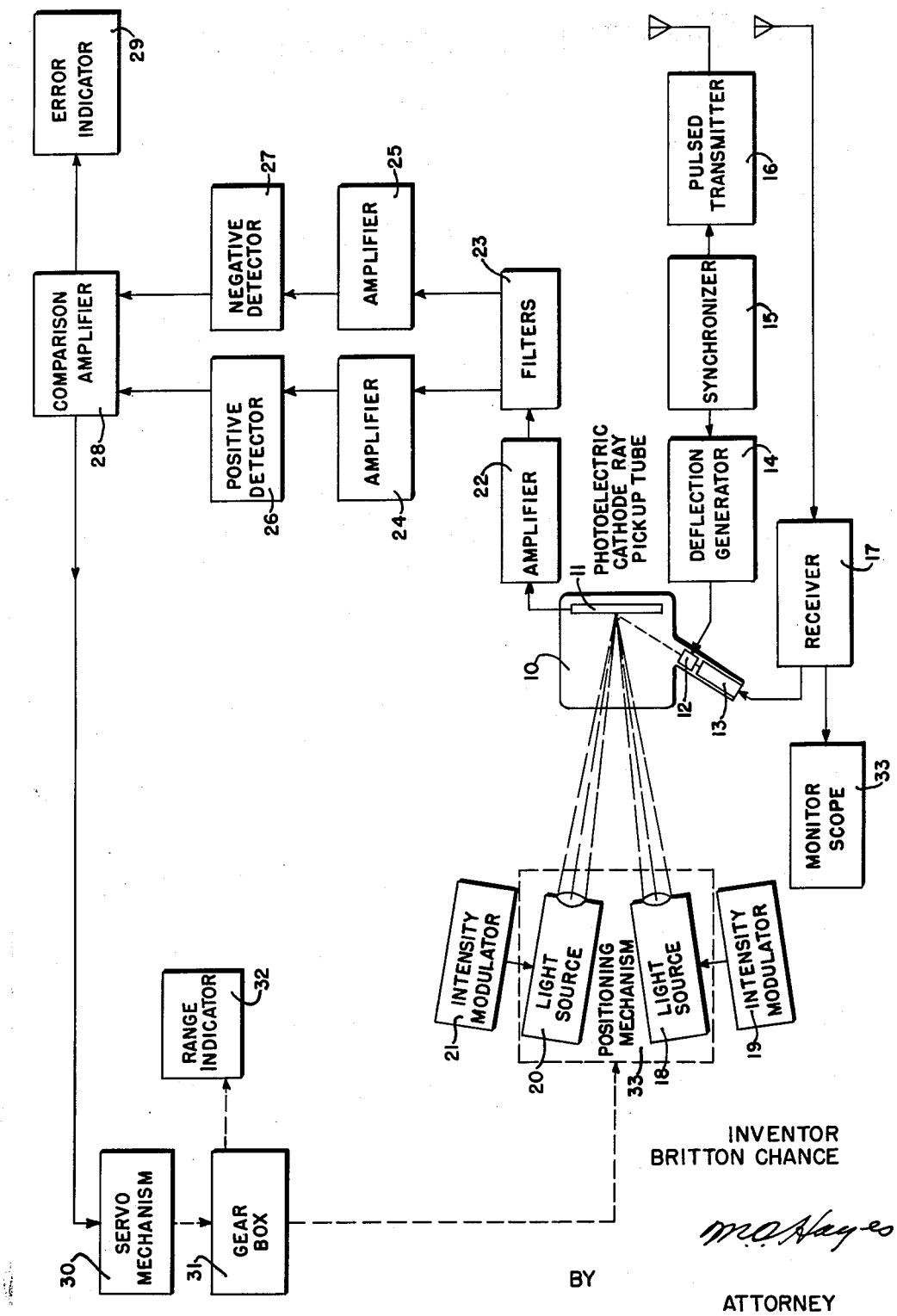
INVENTOR
BRITTON CHANCE
BY *M. O. Hayes*
ATTORNEY

United States Patent Office 2,755,462
Patented July 17, 1956

2,755,462

ICONOSCOPE RADAR-RANGING SYSTEM

Britton Chance, Cambridge, Mass., assignor, by mesne assignments, to the United States of America as represented by the Secretary of the Navy Application February 14, 1946, Serial No. 647,593

10 Claims. (Cl. 343—7)

This invention relates in general to radar systems and in particular to a photoelectric cathode ray pick-up tube indicator for radar systems.

In a radar system a short pulse of electromagnetic energy is transmitted toward the object to be ranged. The energy reflected from the object is received, amplified, and applied to an indicator which determines the elapsed time between transmission and reception of the pulse. As electromagnetic energy travels at a constant and known speed, this time measurement can be converted to a distance measurement.

Heretofore range indicators for radar systems have consisted of oscilloscopes having an accurate time base sweep with means for indicating the instant of transmission of a signal and the instant of reception of a target echo thereon, and means for measuring the time interval between the two indications in units of corresponding distance. Radar systems have also provided for automatically tracking the range of a target by providing various gating circuits which act to keep the target echo centered in the produced gates.

The object of this invention is to provide new and novel means for automatically tracking the movement of a target echo obtained from a radar system.

A further object of this invention is to provide means for determining the position of a spot on a cathode ray tube by electronic means.

Other and further objects of this invention will be apparent from the following specification when taken with the accompanying drawing which is a block diagram of an embodiment of this invention.

In a photoelectric cathode-ray pick-up tube comprising a photosensitive signal mosaic, an electron gun, and deflecting means, the amplitude of the output from the signal mosaic depends, among other things, upon both the intensity of the light on the mosaic and the intensity of the electron beam. Examples of such tubes are the well known Iconoscope and Orithiconoscope types and variations based upon them.

In the embodiment of the invention as shown in the drawing a suitable time base sweep is applied to deflecting means 12 of photoelectric cathode-ray pick-up tube 10 from deflection generator 14 which is synchronized by circuit 15 with pulse transmitter 16 of a radar system. Pulses corresponding to the time of transmission and the time of reception of the signal are received by receiver 17 and are applied to the intensifying electrodes in electron gun 13 of the pick-up tube in such a manner that appreciable discharge of illuminated mosaic 11 occurs when the pulses are present and inappreciable discharge in the absence of the pulses. Signal mosaic 11 is illuminated with a very small spot of light from light source 18, which spot can be moved along the sweep trace of the electron beam on the signal mosaic by positioning means 33. An output from the signal electrode of signal mosaic 11 will only be obtained when the light spot and the signal pulse are coincident and thus the position of the signal pulse on the sweep trace is obtained from calibrated range indicator 32.

To simplify the amplification of the signal output, the light spot is intensity modulated by means 19 and thus the output pulses are amplitude modulated at the same frequency. Using a band pass filter tuned to the modulation frequency a narrow band amplifier is used instead of a wide band pulse amplifier to amplify the resulting signal.

In most applications it is insufficient to indicate simply the coincidence of the echo pulse with a portion of the time display, but it is necessary to detect the magnitude and the sense of the error between the signal pulse and the selected time interval. This information is used for precise range measurements and for automatic range tracking.

To achieve the precise range and sense of error, a second portion of the time sweep is illuminated with a light spot from light source 20, this second spot being adjacent to the first illuminated spot. This second light spot is intensity modulated by means 21 at a different frequency from that provided by modulator 19 and thus the output signal will contain pulses amplitude modulated at each of the two frequencies. The output pulses from signal mosaic 11 are amplified by video amplifier 22 to a suitable level and then the two frequency components are separated by suitable filters 23 which are tuned to the frequencies of modulators 19 and 21. The frequency components are further amplified by amplifiers 24 and 25 and the resulting signals are rectified by detectors 26 and 27 which are connected to give opposite polarity outputs. These signals are coupled to comparison amplifier 28, the output of which is the difference between the two inputs. Amplifier 28 is coupled to error indicator 29 and to servo mechanism 30 which positions the light spots on the signal mosaic of pick-up tube 10.

When a signal pulse from receiver 17 is centered between the two light spots on signal mosaic 11 the output amplitude of each of the light modulating frequency components will be equal and the output from comparison amplifier 28 will be zero. Thus indicator 29 will read zero, servo mechanism 30 will not move the light spots and range indicator 32 will read the correct range to the target. When the target moves in range, the signal pulse from receiver 17 moves away from the center position between the two light spots on signal mosaic 11 and the output amplitude of one of the modulating frequencies will increase while the other will decrease, and the output from comparison amplifier 28 will be a voltage whose magnitude is proportional to the error and whose polarity depends upon the direction of movement of the target. The magnitude and direction of the error is shown on error indicator 29, and this error voltage fed into servo mechanism 30 will cause the servo mechanism to position the light spots by positioning apparatus 33 to reduce the error to zero. Thus the light spots automatically follow the target spot as it moves across signal mosaic 11, and range indicator 32 shows the correct range to the target at all times.

Monitor indicator 33 is used as a visual indicator to determine which target to track and as a visual means for initially positioning the light spots on the proper target.

It is not intended that this invention be limited to the details as shown but is to be limited only by the following claims.

What is claimed is:

1. In combination with a radar system means for automatically tracking a target echo comprising a photoelectric cathode ray pick-up tube including a photosensitive mosaic, an electron gun, and means for deflecting the electron beam produced by said electron gun, means for intensity modulating said electron beam with said target echo, means for illuminating said photosensitive mosaic with two light beams focused in small spots, means for intensity modulating one of said light beams with a first frequency and means for intensity modulating the second of said light beams with a second frequency, means for positioning said light spots on said signal mosaic so that said light spots are adjacent to each other and fall upon said target echo, means for separating the resulting signal into two signals, each of a frequency corresponding to said frequencies of modulation of said light beams, means for rectifying said separated signals, means for comparing the magnitude of said rectified signals, means for abstracting the difference in magnitude of said rectified signals, means for indicating said difference signal, means including a servo mechanism for using said difference signal to position said light spots on said target echo, and means for indicating said range of said target echo from the position of said light spots.

2. In combination with an object detecting and distance determining system having a transmitter for radiating radio frequency search pulses and a receiver for subsequently detecting these pulses after reflections from remote targets, a range indicator comprising a cathode ray storage tube including a photo-sensitive mosaic surface adapted to be charged upon illumination and a scanning electron beam, means for intensifying said scanning beam in response to reflected pulses detected by said receiver thereby to produce electrical output signals from charged areas of said mosaic, and means for varying the position of an illuminated spot on said mosaic along the scanning path of said beam until an output signal is produced, said last-mentioned means providing an indication of the range of the target corresponding to the reflected pulse intensifying said beam at said output signal position.

3. In combination with a transmitter for radiating radio frequency search pulses and a receiver for detecting these pulses after reflections from remote targets, a range indicator comprising a cathode ray storage tube having a photo-sensitive mosaic surface adapted to be charged upon illumination and a scanning beam, means responsive to the reception of reflected pulses detected by said receiver for the intensifying said scanning beam thereby to produce electrical output signals from charged areas of said mosaic, means for varying the position of first and second adjacently spaced illuminated spots on said mosaic along the path taken by said scanning beam until first and second equal amplitude output signals are produced, said last-mentioned means providing an indication of the range of the target corresponding to the reflected pulse intensifying said beam at said equal amplitude output signal position.

4. In combination with a transmitter for periodically radiating radio frequency search pulses and a receiver for subsequently detecting these pulses after reflections from remote targets, a range indicator comprising a cathode ray storage tube having a photo-sensitive mosaic surface adapted to be charged upon illumination and a scanning electron beam, means responsive to the reception of reflected pulses for intensifying said scanning beam thereby to produce electrical output signals from charged areas of said mosaic surface, means for illuminating adjacent spots of said mosaic to charge two finite areas thereof whereby first and second output signals are produced whenever said areas are scanned by the intensified beam, and means for varying the position of said illuminated spots on said mosaic surface until equal amplitude first and second output signals are produced, said last-mentioned means providing an indication of the range of the target corresponding to the reflected pulse intensifying said beam to produce said equal amplitude output signals.

5. In combination with an object detecting and distance determining system having a transmitter for radiating search pulses and a receiver for detecting reflected pulses returned from remote targets, a range indicator comprising a cathode ray storage tube having as a component thereof a photo-sensitive mosaic surface adapted to be charged upon illumination, means for scanning said mosaic with the electron beam of said tube, said scanning operation commencing simultaneously with the radiation of said search pulses, means for coupling reflected pulses detected by said receiver to the control electrode of said tube to intensify said electron beam to a degree capable of producing electrical output signals from charged areas of said mosaic, means for projecting a discrete spot of light on said mosaic to charge a finite area thereof, means for varying the position of said spot along the scanning path of said beam to establish coincidence between the position of said spot and the position on said mosaic whereat said beam is intensified by a selected target pulse, said last-mentioned means proving an indication of the range to the target corresponding to said selected target pulse.

6. In combination with a transmitter for radiating radio frequency search pulses and a receiver for detecting these pulses after reflections from remote targets, a cathode ray storage tube having a photo-sensitive mosaic surface, means for scanning said mosaic surface with the electron beam of said tube, said scanning operation commencing simultaneously with the radiation of said search pulses, means for coupling reflected pulses detected by said receiver to the control electrode of said tube to intensify said electron beam to a degree capable of producing electrical output signals from charged areas of said mosaic, a pair of light beams intensity modulated at first and second frequencies respectively, means for projecting said light beams on said mosaic surface to charge adjacent finite areas thereof, means for moving said light beams along the path of said scanning beam without altering their relative positions to a location whereat equal amplitude electrical output signals of said first and second frequencies are produced, said last-mentioned means providing an indication of the range of the target corresponding to the reflected pulse intensifying said beam at said equal amplitude signal position.

7. In combination with a transmitter for radiating search pulses and a receiver for detecting these pulses after reflections from remote targets, a cathode ray storage tube having a photosensitive mosaic adapted to be charged upon illumination, means for scanning said mosaic with the electric beam of said tube, said scanning operation commencing simultaneously with the radiation of said search pulses, means for coupling reflected pulses to the control electrode of said tube to thereby intensify said electron beam to a degree capable of producing electrical output signals from charged areas of said mosaic, means for focusing two spots of light on said mosaic to charge adjacent finite areas thereof, means for varying the location of said spots along the scanning path of said beam without altering their separation to establish substantial coincidence between the location of said charged areas and the location on said mosaic whereat said beam is intensified by a selected target pulse whereby equal amplitude output signals are produced, said last-mentioned means providing an indication of the range of the target corresponding to said selected target pulse.

8. In a system as defined in claim 7, means automatically responsive to an inequality in the amplitude of said output signals occasioned by the movement of said selected target and a change in the time of occurrence of said reflected target pulse for repositioning said spots along the scanning path of said beam until said signal amplitudes are again equalized.

9. In a system as defined in claim 7, means responsive to a subsequent occurrence of unequal amplitude output signals for automatically moving said spots to a new position on said mosaic whereat equal amplitude output signals are obtained, said last-mentioned means including means for producing a control signal proportional to the difference in amplitudes of said signals and a servomechanism responsive to said control signal for moving said focusing means.

10. In combination with an object detecting and distance determining system having a transmitter for radiating search pulses and receiver for detecting these pulses after reflections from remote targets, a cathode ray storage tube having a photosensitive mosaic surface adapted to be charged upon illumination, means for scanning said mosaic with the electron beam of said tube, said scanning operation commencing simultaneously with the radiation of said search pulses, means for coupling reflected pulses detected by said receiver to a control electrode of said tube to intensify said beam to a degree capable of producing electrical output signals from charged areas of said mosaic, means for illuminating said photosensitive mosaic with two light beams focused in small spots, means for intensity modulating one of said light beams with a first frequency, means for intensity modulating the second of said light beams with a second frequency, means for orientating said light spots on said mosaic such that adjacent areas of said mosaic are charged, means for varying the location of said spots without altering their relative positions to establish substantial coincidence between the location of said charged areas and the location on said mosaic whereat said beam is intensified by a selected target pulse whereby substantially equal amplitude electrical output signals of said first and second frequencies are produced, and means responsive to a change in the time of occurrence of said selected target pulse and the attendant amplitude inequality of said signals for repositioning said light spots to a new location whereat the amplitudes of said signals are again equalized, said means for varying the position of said spots providing an indication of the range to the target corresponding to the reflected pulse intensifying said beam at said equal amplitude output signal position.

References Cited in the file of this patent

UNITED STATES PATENTS

| | | |
|---|---|---|
| 2,293,899 | Hanson | Aug. 25, 1942 |
| 2,372,450 | Rajchman et al. | Mar. 27, 1945 |
| 2,403,562 | Smith | July 9, 1946 |
| 2,403,975 | Graham | July 16, 1946 |
| 2,412,669 | Bedford | Dec. 17, 1946 |
| 2,415,981 | Wolff | Feb. 18, 1947 |
| 2,422,295 | Eaton | June 17, 1947 |
| 2,508,384 | Gross | May 23, 1950 |